United States Patent
Guo et al.

(10) Patent No.: US 9,990,310 B2
(45) Date of Patent: Jun. 5, 2018

(54) SELF-ENABLED BUS CONFLICT DETECTION CIRCUIT

(71) Applicants: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

(72) Inventors: Zhen Ye Guo, Shanghai (CN); Zhen Jiang Su, Shanghai (CN); Er Yuan Feng, Shanghai (CN)

(73) Assignees: Semiconductor Manufacturing International (Shanghai) Corporation, Shanghai (CN); Semiconductor Manufacturing International (Beijing) Corporation, Beijing (CN)

( * ) Notice: Subject to any disclaimer, the term of this patent is extended or adjusted under 35 U.S.C. 154(b) by 71 days.

(21) Appl. No.: 15/299,453

(22) Filed: Oct. 20, 2016

(65) Prior Publication Data
US 2017/0351622 A1    Dec. 7, 2017

(30) Foreign Application Priority Data
Jun. 1, 2016    (CN) .......................... 2016 1 0379422

(51) Int. Cl.
*G06F 13/00*    (2006.01)
*G06F 1/00*    (2006.01)
(Continued)

(52) U.S. Cl.
CPC .......... *G06F 13/102* (2013.01); *G06F 1/3296* (2013.01); *G06F 13/4282* (2013.01)

(58) Field of Classification Search
None
See application file for complete search history.

(56) References Cited

U.S. PATENT DOCUMENTS

| 5,592,509 A | 1/1997 | McClear et al. |
| 5,859,851 A | 1/1999 | Young et al. |
(Continued)

FOREIGN PATENT DOCUMENTS

JP    60117843    6/1985

OTHER PUBLICATIONS

European Application No. 17173741.4, Extended European Search Report dated Oct. 24, 2017, 6 pages.

*Primary Examiner* — Hyun Nam
(74) *Attorney, Agent, or Firm* — Kilpatrick Townsend and Stockton LLP

(57) ABSTRACT

A bus contention detection circuit includes a delay unit having an input terminal for receiving an output signal of an I/O driver, a duty cycle adjustment unit connected to the delay unit, and a comparison unit having a first input terminal for receiving the output signal, a second terminal for receiving a reference voltage, and an enable terminal for receiving an enable signal of the duty cycle adjustment unit. The enable signal has a rising edge that is delayed relative to a rising edge of the output signal and a falling edge that is aligned with a falling edge of the output signal. The comparison unit compares a voltage level of the output signal with the reference voltage when the enable signal is in a stable voltage state and determine a bus condition in response to a comparison result.

11 Claims, 3 Drawing Sheets

(51) Int. Cl.
*G06F 13/10* (2006.01)
*G06F 13/42* (2006.01)
*G06F 1/32* (2006.01)

(56) References Cited

U.S. PATENT DOCUMENTS

| | | | |
|---|---|---|---|
| 7,890,789 B2* | 2/2011 | Hoyer | G06F 1/04 |
| | | | 327/166 |
| 9,673,798 B1* | 6/2017 | Tang | H03K 5/1565 |
| 2008/0036517 A1* | 2/2008 | Huang | H03K 5/1565 |
| | | | 327/175 |
| 2009/0254687 A1 | 10/2009 | Lin et al. | |
| 2013/0346721 A1* | 12/2013 | Giovannini | G11C 7/222 |
| | | | 711/167 |

* cited by examiner

SELF-ENABLED BUS CONFLICT DETECTION CIRCUIT

CROSS-REFERENCES TO RELATED APPLICATIONS

This application claims priority to Chinese patent application No. 201610379422.3, filed on Jun. 1, 2016, the content of which is incorporated herein by reference in its entirety.

FIELD OF THE INVENTION

The present invention relates generally to integrated circuits. More particularly, embodiments of the present invention relate to a bus conflict (bus contention) detection circuit and device.

BACKGROUND OF THE INVENTION

In modern electronic systems, from the perspective of bandwidth and performance, a master device, e.g., a controller, a microprogrammed control unit (MCU), and the like, does not generally connect to only one slave device. Multiple devices are generally coupled to an input/output (I/O) bus. In such configuration, only a master slave or a slave device is active to drive the bus at a given time.

The following conditions can lead to undesirable bus behavior: (1) manufacturing defects or system failure; (2) more than one device drives the bus at the same time, or no device drives the bus.

Conventional bus contention detection circuits include two receiver modules and a logic unit, each of the receiver modules includes a threshold range and receives a signal from the bus and outputs the signal to the logic unit. The logic unit determines a bus contention condition based on which signal is within the threshold range of the receiving modules. However, conventional bus contention detection circuits are constrained by the receiver modules' circuit structure, which restricts the internal threshold range, resulting in a relatively low detection accuracy. The receiver modules and the logic unit also require additional enable signals from core logic that further restrict the applicability of the bus contention detection circuits. For example, when the core logic fails, the detection circuit does not operate properly and fails to detect the bus contention condition on time.

BRIEF SUMMARY OF THE INVENTION

Embodiments of the present invention provide a novel self-enabled bus conflict (contention) detect circuit for detecting contention (conflict) of a bus simultaneously driven by a plurality of output signals from a plurality of I/O drivers. In some embodiments, the bus contention detection circuit includes a delay unit having an input terminal connected to an input terminal of an I/O driver and an output terminal, a duty cycle adjustment unit having an input terminal connected to the output terminal of the delay unit and an output terminal and a comparison unit having a first input terminal connected to an output terminal of the I/O driver, a second terminal connected to a reference voltage, and an enable terminal connected to the output terminal of the duty cycle adjustment unit.

The delay unit generates a delay signal from an input signal applied to the input terminal of the I/O driver and provides the delay signal to the duty cycle adjustment unit, the delay signal having a delay substantially equal to a delay of an output signal of the I/O driver, the output signal of the I/O driver being applied to the bus. The duty cycle adjustment unit, after processing the delay signal, outputs an enable signal to the enable terminal of the comparison unit, the enable signal having a rising edge that is delayed in relation to a rising edge of the output signal of the I/O driver and a falling edge that is substantially aligned with a falling edge of the output signal of the I/O driver. The comparison unit compares a voltage level of the output signal of the I/O driver on the bus with the reference voltage when the enable signal is in a stable voltage state and determine a bus condition in response to a comparison result.

In one embodiment, the comparison unit determines that the bus condition is a bus contention condition when the voltage level of the output signal of the I/O driver on the bus is lower than or equal to the reference voltage, and that the bus condition is a normal bus condition when the voltage level of the output signal of the I/O driver on the bus is higher than the reference voltage.

In one embodiment, the comparison unit outputs a first voltage level when the voltage level of the output signal of the I/O driver on the bus is lower than or equal to the reference voltage, and a second voltage level when the voltage level of the output signal of the I/O driver on the bus is higher than the reference voltage, the first voltage level being higher than the second voltage level.

In one embodiment, the duty cycle adjustment unit includes a first inverter comprising an input terminal connected to the output terminal of the delay unit, a ground terminal connected to a ground potential, and an output terminal, a second inverter comprising an input terminal connected to the output terminal of the first inverter, a ground terminal connected to the ground potential, and an output terminal, a waveform integration unit comprising an input terminal connected to the output terminal of the second inverter and an output terminal, a capacitor comprising a first terminal connected to the output terminal of the second inverter and the input terminal of the waveform integration unit at a node, and a second terminal connected to the ground potential, and a current source having an output terminal connected to a power supply terminal of the first inverter and a power supply terminal of the second inverter.

In one embodiment, the waveform integration unit includes a plurality of series-connected stage inverters, a subsequent stage inverter having a signal magnification factor being higher than a signal magnification factor of an immediate preceding stage inverter, a stage inverter having a lowest signal magnification factor being connected to the output terminal of the second inverter, and a stage inverter having a highest signal magnification factor being a last stage inverter of the series-connected stage inverters.

In one embodiment, the first inverter may include a first PMOS transistor and a first NMOS transistor, the first PMOS transistor having a gate connected to a gate of the first NMOS transistor and the input terminal of the first inverter, a source connected to the power supply terminal of the first inverter and the output terminal of the current source, and a drain connected to a drain of the first NMOS transistor and to the output terminal of the first inverter; the first NMOS transistor having a source connected to the ground potential.

In one embodiment, the second inverter may include a second PMOS transistor and a second NMOS transistor, the second PMOS transistor having a gate connected to a gate of the second NMOS transistor and the input terminal of the second inverter, a source connected to the power supply terminal of the second inverter and the output terminal of the current source, and a drain connected to a drain of the second NMOS transistor and to the output terminal of the second inverter; the second NMOS transistor having a source connected to the ground potential.

In one embodiment, the delay unit includes a plurality of series-connected stage inverters, a first stage inverter of the series-connected stage inverters having an input terminal connected to the input terminal of the delay unit and the input terminal of the I/O driver; a last stage inverter of the series-connected stage inverters having an output terminal connected to the output terminal of the delay unit and the input terminal of the duty cycle adjustment unit.

In one embodiment, the reference voltage is k times a voltage level of the output signal of the I/O driver on the bus under a normal bus condition, k being a scaling factor. In one embodiment, k satisfies the relation: $0.9 \leq k < 1.0$.

In one embodiment, the delay signal, the enable signal and the output signal of the I/O driver each are rectangular wave signals.

The following description, together with the accompanying drawings, will provide a better understanding of the nature and advantages of the claimed invention.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

It will be understood that the drawings are not drawn to scale, and similar reference numbers are used for representing similar elements. Embodiments of the invention are described herein with reference to functional block diagrams that are schematic illustrations of idealized embodiments (and intermediate structures) of the invention.

It will be understood that, when an element or component is referred to as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

Figure 1:
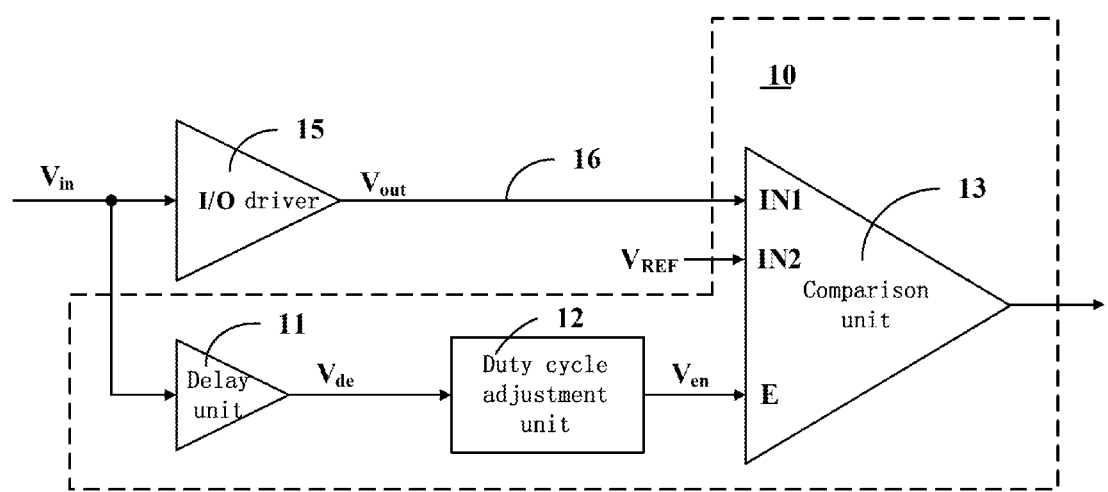
FIG. 1 is a simplified schematic circuit diagram illustrating a bus contention detection circuit according to an embodiment of the present invention.
Figure 2:
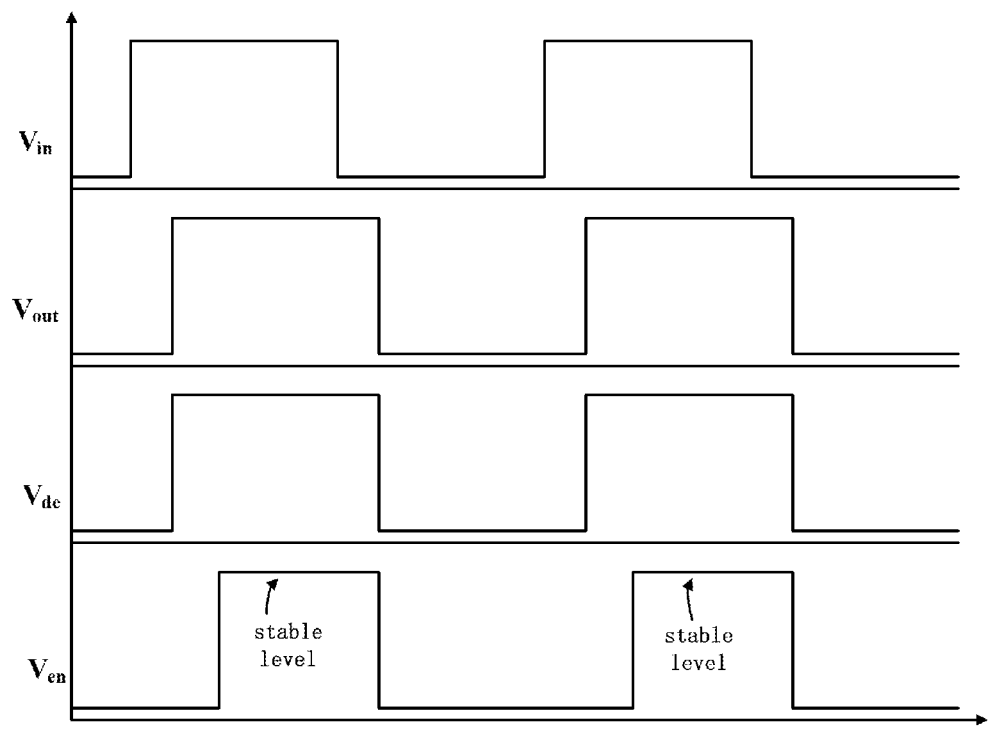
FIG. 2 is a schematic timing diagram of a bus contention detection circuit according to an embodiment of the present invention.

FIG. 1 is a simplified schematic circuit diagram illustrating a bus contention detection circuit 10 according to an embodiment of the present invention. FIG. 2 is a schematic timing diagram of the bus contention detection circuit of FIG. 1. As used herein, the terms "bus contention" and "bus conflict" are used interchangeably.

Referring to FIG. 1, bus contention detection circuit 10 includes a delay unit 11, a duty cycle adjustment unit 12, and a comparison unit 13. The comparison unit 13 includes a first input terminal IN1, a second input terminal IN2, and an enable terminal E. As shown in FIG. 1, delay unit 11 includes an input terminal connected to an input terminal of an input/output (I/O) driver 15 operative to drive a bus 16. Delay unit 11 includes an output terminal connected to an input terminal of duty cycle adjustment unit 12. Duty cycle adjustment unit 12 has an output terminal connected to enable terminal E of comparison unit 13. I/O driver 15 has an output terminal connected to an end of bus 16. Bus 16 includes another end connected to first input terminal IN1 of comparison unit 13.

In an embodiment, delay unit 11 generates a delay signal Vde of a signal Vin applied to its input terminal and provides the delay signal Vde to duty cycle adjustment unit 12, as shown in FIG. 1. The delay signal Vde and the signal Vout at the output of the I/O driver have a substantial equal delay time with respect to the input signal Vin, as shown in FIG. 2. The I/O driver 15 is operative to output the signal Vout in response to the input signal Vin to drive the bus 16.

Generally, referring to FIG. 2, the I/O driver 15 is configured to receive the input signal Vin and output the output signal Vout after a predetermined delay time. The delay unit 11 is configured to receive the input signal Vin and output the delay signal Vde. In the embodiment, the delay time through the I/O driver and the delay time through the delay unit 11 are substantially the same, so that the signals Vout and Vde can be simultaneously applied to the next logic stage.

It should be noted that the term "substantially equal" or "substantially the same" is to be understood that the delay time of the delay unit and the delay time of the I/O driver are equal or the difference ratio "a" between the two delay times is within a predetermined range. The difference ratio "a" is calculated by the following relation:

$$a = \left| \frac{t_{V_{de}} - t_{V_{out}}}{t_{V_{out}}} \times 100\% \right| \quad (1)$$

where $t_{V_{de}}$ is the delay time of the signal Vde with respect to the input signal Vin, $t_{V_{out}}$ is the delay time of the signal Vout with respect to the input signal Vin. For example, 0<a≤20%, e.g., a=2%, 5%, or 10% based on actual application requirements.

In the embodiment, the duty cycle adjustment unit 12 processes the received delay signal Vde and outputs a duty cycle adjusted signal Ven to the input terminal E of the comparison unit 13, as shown in FIG. 1. Referring to FIG. 2, the rising edge of the duty cycle adjusted signal Ven has a delay with respect to the rising edge of the output signal Vout of the I/O driver 15, and the falling edge of the duty cycle adjusted signal Ven has no delay with respect to the falling edge of the output signal Vout of the I/O driver 15. Since the drive signal on the bus has generally a transition time (when the signal transits from high to low or from low to high) under normal operating conditions, the transition time is referred to as the time required for the output signal to reach a steady state. In the embodiment, the rising edge of the enable signal Ven has a time delay with regard to the rising edge of the output signal Vout of the I/O driver, so that the bus contention detection operation only begins after the drive signal on the bus reaches a steady state.

In some embodiments, the falling edge of the enable signal Ven and the falling edge of the output signal Vout of the I/O driver occur at the same time. In other embodiments, the falling edge of the enable signal Ven occurs earlier with respect to the falling edge of the output signal Vout of the I/O driver.

In the embodiment, the first input terminal IN1 of the comparison unit 13 is configured to receive the drive signal of the bus 16. The second input IN2 of the comparison unit 13 is configured to receive a predetermined reference signal Vref. The comparison unit 13 is operative to compare the drive signal on the bus 16 with the reference voltage when the voltage level of the enable signal Ven is stable (see FIG. 2), the comparison unit 13 determines whether or not a bus contention occurs based on the result of the comparison. A bus contention can thus be detected by comparing the bus drive signal with the predetermined reference voltage. According to the present invention, the bus contention detection circuit does not require any additional or external enable signal.

In one embodiment, when the voltage of the bus drive signal is lower than or equal to the voltage of the reference signal, the comparison unit 13 determines that a bus contention occurs on the bus 16. In another embodiment, when the voltage of the bus drive signal is higher than the voltage of the reference signal, the comparison unit 13 determines that no bus contention occurs on the bus 16.

In the above-described embodiment, when no bus contention occurs, the drive signal on the bus has generally a high level. When a bus contention occurs, the voltage level of the drive signal on the bus will fall, for example the voltage level will drop to half of the level before the bus contention. Thus, the voltage level of the reference voltage can be set to be higher than half of the voltage level of the bus under the normal condition (i.e., there is no bus contention). For example, the voltage level of the reference voltage can be set to 90% of the level of the bus operating under the normal condition. If the comparison unit determines that the voltage level of the drive signal is lower than or equal to the reference voltage, it indicates that there is a bus contention. If the comparison unit determines that the voltage level of the drive signal is higher than the reference voltage, it indicates that there is no bus contention.

In one embodiment, when the voltage level of the bus drive signal is lower than or equal to the voltage level of the reference signal, the comparison unit 13 outputs a first voltage level. In another embodiment, when the voltage level of the bus drive signal is higher than the voltage level of the reference signal, the comparison unit 13 outputs a second voltage level. In one embodiment, the first voltage level is higher than the second voltage level. That is, the comparison unit outputs a high voltage level (i.e., the first voltage level) when a bus contention occurs, and the comparison unit outputs a low voltage level (i.e., the first voltage level) when no bus contention occurs.

In one embodiment, the voltage level of the reference signal is k times the voltage level of the drive signal on the bus when there is no bus contention. The parameter k is a proportionality factor. For example, k can be in the range 0.9≤k<1. In the embodiment, the value of k can be determined based on actual requirements, for example, k can be 0.92, 0.95, 0.98, etc. The higher the value of k, the higher the accuracy of the bus contention detection circuit. Since the value of k can be chosen to be relatively high, it is possible to improve the accuracy of the bus contention detection circuit.

In one embodiment, the delay signal Vde, the enable signal Ven, and the output signal Vout of the I/O driver are rectangular wave signals.

Figure 3:
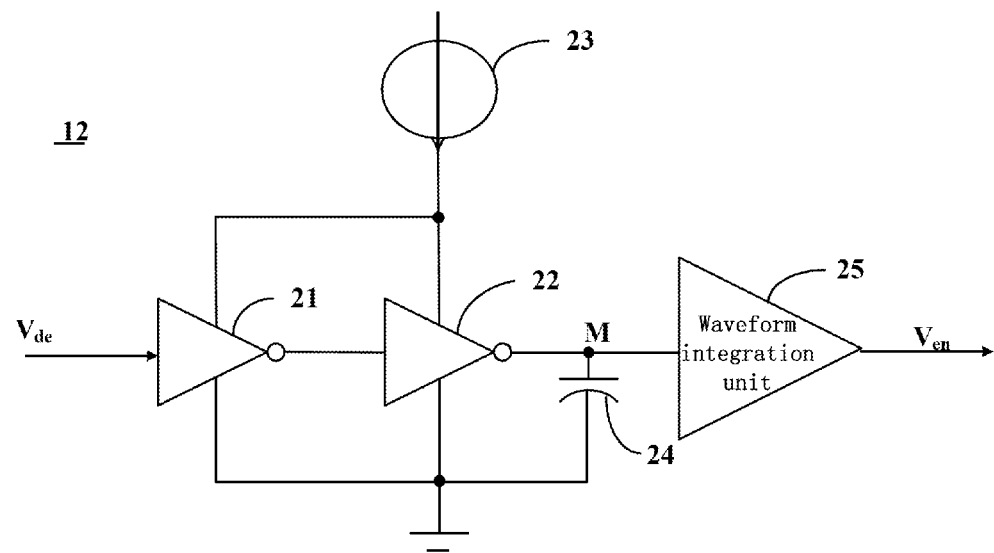
FIG. 3 is a simplified schematic circuit diagram illustrating a duty cycle adjustment unit of a bus contention detection circuit according to an embodiment of the present invention.

FIG. 3 is a simplified schematic circuit diagram illustrating a duty cycle adjustment unit 12 of a bus contention detection circuit according to an embodiment of the present invention. Referring to FIG. 3, duty cycle adjustment unit 12 may include a first inverter 21, a second inverter 22, a current source 23, a capacitor 24, and a waveform integration unit 25. The delay signal Vde of the delay unit 11 is connect to an input terminal of the first inverter 21. The first inverter 21 includes an output terminal connected to an input terminal of the second inverter 22. The second inverter 22 includes an output terminal connected to an input terminal of the waveform integration unit 25 and one end of the capacitor 24 at a node M. The waveform integration unit 25 includes an output terminal connected to the enable terminal E of the comparison unit 13. The current source 23 includes an output terminal connected to the power supply terminal of the first inverter 21 and second inverter 22. The ground terminal of the first and second inverters 21, 22 and the other end of the capacitor 24 are connected to a ground potential.

One of skill in the art will appreciate that the duty cycle adjustment unit may have any number of inverters, such as fewer than or more than two inverters. It is noted that, although two inverters are shown, it is, however, understood, that the duty cycle adjustment unit can have multiple inverters depending upon the application requirements.

In the embodiment, the number of current sources or the output current amount of the current source, and the size of the capacitor can be determined according to actual requirements. For example, the output current of the current source and the capacitor size can be determined based on the delay of the rising edge (i.e., the delay time of the rising edge of the enable signal Ven with regard to the rising edge of the output signal Vout of the I/O driver 15) and the voltage level change of the delay signal after being processed in the duty cycle adjustment unit. For example, the capacitor size can be computed with the following relation:

$$C = \frac{I \times dt}{dV}, \qquad (2)$$

where dt is the rising edge delay of the output signal of the I/O driver, dV is the voltage level of the waveform integration unit in response to the input voltage, it is also referred to as the threshold voltage level of the waveform integration unit, and may typically be designed to 1.5VDD.

The above relation (2) provides a number of combinations of current values and capacitor sizes. In other words, the number of current sources (e.g., according to the required output current of each current source and the total output current I to determine the number of current sources), or the output current of the current source (e.g., based on the required number of current sources and the total output current to determine the output current of each current source), and the capacitor size. In an embodiment, the current sources may be the same or different. For example, a current source may have one or more 2-bit, 3-bit, or more bits unit current sources. In an embodiment, the duty cycle adjustment unit may be programmable. For example, the current source of the duty cycle adjustment unit may be a programmable current source, and the output current is adjustable, so that the duty cycle is programmable.

In the embodiment, the rising edge delay may be determined by the rising edge transition time or the falling edge transition time of the I/O driver output signal on the bus. For example, the current source current and the RC network formed at the M node of the capacitor face a delay of a few nanoseconds, that means the rising edge of the signal Ven has a delay of a few nanoseconds with regard to the rising edge of the output signal Vout of the I/O driver, for example, the delay of the signal Ven in relation to the signal Vout is about 3 ns to about 6 ns. The rising edge transition time or the falling edge transition time of most I/O drivers is within this range. By accurately controlling the combination of current source(s) and the capacitor the rising edge of the enable signal can be delayed, but the falling edge of the enable signal is not substantially delayed.

Figure 4:
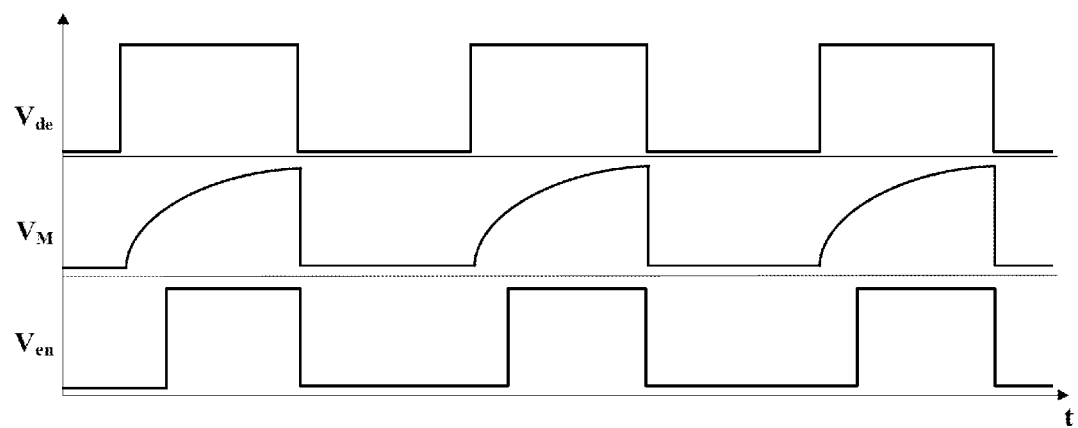
FIG. 4 is a schematic timing diagram illustrating a duty cycle adjustment unit of a bus contention detection circuit according to an embodiment of the present invention.

FIG. 4 is a schematic timing diagram illustrating a duty cycle adjustment unit of a bus contention detection circuit according to an embodiment of the present invention. FIG. 4 shows voltage waveforms of delay signal Vde, voltage $V_M$ at the node M and enable signal Ven. The delay signal Vde is a rectangular wave, the signal $V_M$ is a triangular wave with a slowly rising edge and a steep falling edge, the enable signal Ven is a rectangular wave with a delay relative to the delay signal Vde. As shown in FIG. 4, after being processed by the duty cycle adjustment unit, the rising edge of the enable signal Ven has a delay with regard to the rising edge of the delay signal Vde, i.e., the rising edge of the enable signal Ven also has a delay with regard to the rising edge of the output signal Vout of the I/O driver.

Figure 5:
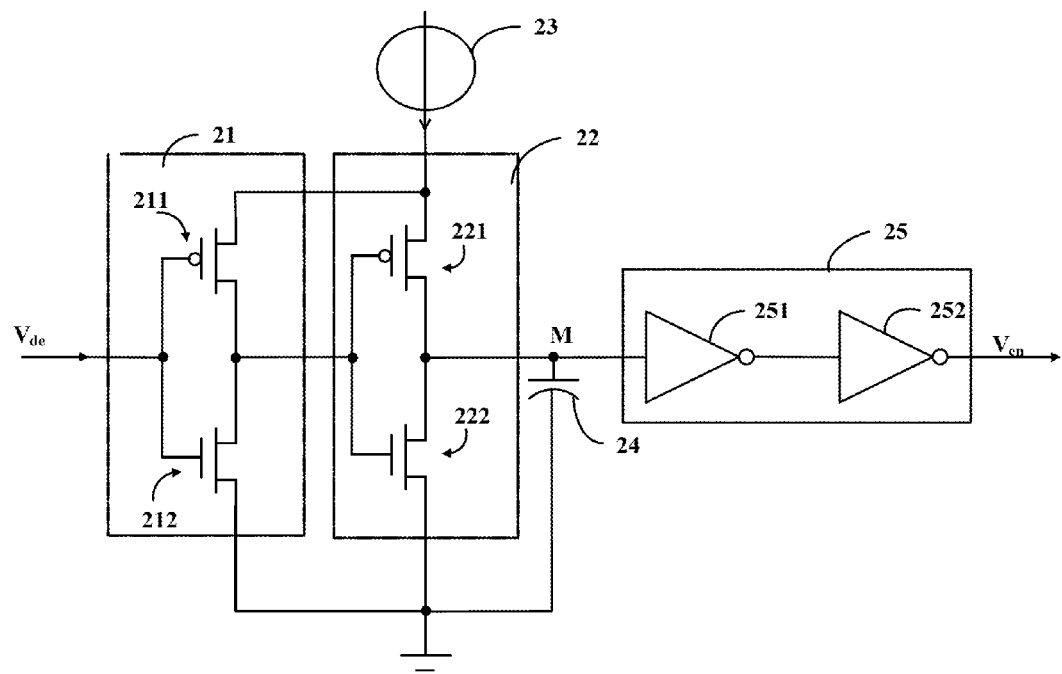
FIG. 5 is a simplified schematic circuit diagram illustrating a duty cycle adjustment unit of a bus contention detection circuit according to another embodiment of the present invention.

FIG. 5 is a simplified schematic circuit diagram illustrating a waveform integration unit 25 of a bus contention detection circuit according to another embodiment of the present invention. Waveform integration unit 25 may include a plurality of stage inverters connected in series. Two stage inverters 251 and 252 are shown in FIG. 5. In the sequence of series connected stage inverters, a following stage inverter has a signal amplification factor that is greater than the amplification factor of a previous stage inverter. For example, the second stage inverter 252 has a magnification factor greater than the magnification factor of the first stage inverter 251. That is, the waveform integration unit includes a plurality of progressively larger stage inverters that are connected in series. The stage inverter with the smallest magnification factor includes an input terminal that is the input terminal of the waveform integration unit, and the stage inverter with the largest magnification factor is the last stage inverter in the series and includes an output terminal that is the output terminal of the waveform integration unit. For example, as shown in FIG. 5, the input terminal of the first stage inverter 251 is the input terminal of the waveform integration unit 25, the input terminal of the first stage inverter 251 is connected to the output terminal of the second inverter 22 and the one end of the capacitor 24 at the node M. The output terminal of the second stage inverter 252 is the output terminal of the waveform integration unit 25 and is connected to the enable terminal E of the comparison unit 13. The waveform integration unit is configured to shape the signal at the node M to a pulse signal having steep rising and falling edges (i.e., Ven), as shown in FIG. 4.

It is understood that the number of stage inverters can be any integer number N. In the example shown in FIG. 5, two stage inverters are used. But it is understood that the number is arbitrary chosen for describing the example embodiment and should not be limiting.

In an embodiment, referring still to FIG. 5, first inverter 21 may include a first PMOS transistor 211 and a first NMOS transistor 212. The gate of the first PMOS transistor 211 and the gate of the first NMOS transistor 212 are connected together to the input terminal of first inverter 21 for receiving the delay signal Vde of delay unit 11. The source of first PMOS transistor 211 is connected to the output terminal of current source 23 and configured as a power supply terminal of the first inverter. The drain of first PMOS transistor 211 is connected to the drain of the first NMOS transistor and is configured to be the output terminal of the first inverter connected to the input terminal of second inverter 22. The source of the first NMOS transistor is connected to the ground potential and is configured to be the ground terminal of first inverter 21.

In an embodiment, as shown in FIG. 5, second inverter 22 may include a second PMOS transistor 221 and a second NMOS transistor 222. The gate of second PMOS transistor 221 and the gate of second NMOS transistor 222 are connected together and configured to be the input terminal of second inverter 22 connecting to the output terminal of first inverter 21. The source of second PMOS transistor 221 is connected to the output terminal of current source 23 and configured to be a power supply terminal of the second inverter. The drain of second PMOS transistor 221 is connected to the drain of the second NMOS transistor and is configured to be the output terminal of the second inverter connected to the input terminal of the waveform integration unit 25. The source of the second NMOS transistor is connected to the ground potential and is configured to be the ground terminal of second inverter 22.

The current of the current source charges the capacitor at the node M through the second PMOS transistor, in order to obtain a delay in the rising edge. The capacitor is discharged to the ground through the second NMOS transistor. Because the discharge path does not include a limiting current source, and the second NMOS transistor is designed to have a small on-resistance, so that the falling edge does not face a substantial delay.

In the embodiment, the delay unit may also include a plurality of stage inverters connected in series. The first stage inverter includes an input terminal that is configured to be the input terminal of the delay unit and connected to the input terminal of the I/O driver. The last stage inverter includes an output terminal that is the output terminal of the delay unit and connected to the input terminal of the duty cycle adjustment unit.

Figure 6:
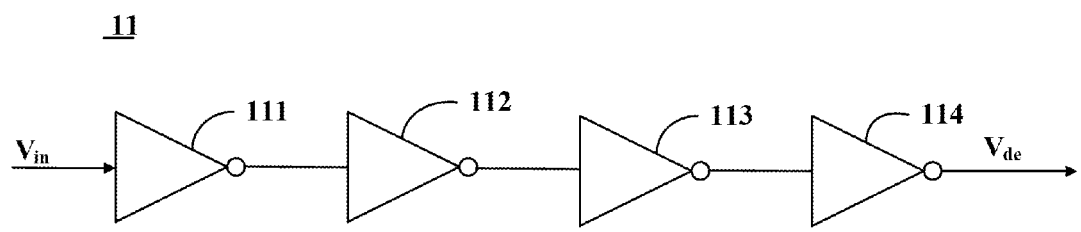
FIG. 6 is a simplified schematic circuit diagram illustrating a delay unit of a bus contention detection circuit according to an embodiment of the present invention.

FIG. 6 is a simplified schematic circuit diagram illustrating a delay unit 11 of a bus contention detection circuit according to an embodiment of the present invention. As shown in FIG. 6, delay unit 11 may include first, second, third, and fourth stage inverters 111, 112, 113, and 114 connected in series. First stage inverter 111 includes an input terminal that is the input terminal of the delay unit and connected to the input terminal of the I/O driver for receiving the input signal Vin. Last stage inverter 114 includes an output terminal that is the output terminal of the delay unit and connected to the input terminal of the duty cycle adjustment unit for outputting the delay signal Vde. It is understood that, although only four stage inverters are shown in FIG. 6, the number of stage inverters can be determined according to actual requirements. For example, the number of stage inverters can be determined according to the delay of the output signal Vout with regard to the input signal Vin, so that the delay time of the delay signal of the delay signal is substantially equal to the delay time of the output signal of the I/O driver.

The comparator unit 13 can be implemented in many ways. For example, the comparison unit 13 includes a comparator circuit and a first switch (e.g., a transistor) connected between the power supply and the comparator circuit. The Enable signal Ven may turn on and off the first switch to enable and disable the comparator circuit. For example, the comparator unit 13 may have a second switch connected between the comparator circuit and the ground, and the Enable signal Ven may turn on and off the second switch to enable and disable the comparator circuit. The comparator unit may also include both first and second switches that are then turned and off by the Enable signal Ven. For example, the Enable signal Ven may turn on and off other parts of the comparator circuit to enable and disable comparator unit 13. One skilled in the art will appreciate that many ways are possible to design a comparator unit with enabling capability.

Embodiments of the present invention thus provide a bus contention detection circuit that can be applied to a bus having a plurality of connection points. The detection circuit can determine a bus contention after the rising edge of the enable signal that is in the stable state. The enable signal is obtained by processing the input signal applied to the I/O driver without the need of an additional and dedicated enable signal of the core logic, thus, the detection circuit includes a self-enabled function. Compared with conventional bus contention detection circuits, the detection circuit of the present invention can dynamically determine the bus state regardless of whether the core logic is in the active or idle state. In addition, the bus contention detection circuit of the present invention improves the detection accuracy of a bus contention.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A circuit of detecting contention of a bus simultaneously driven by a plurality of output signals from a plurality of I/O drivers, the circuit comprising:
a delay unit comprising an input terminal connected to an input terminal of an I/O driver and an output terminal;
a duty cycle adjustment unit comprising an input terminal connected to the output terminal of the delay unit and an output terminal; and
a comparison unit comprising a first input terminal connected to an output terminal of the I/O driver, a second terminal connected to a reference voltage, and an enable terminal connected to the output terminal of the duty cycle adjustment unit,
wherein:
the delay unit generates a delay signal from an input signal applied to the input terminal of the I/O driver and provides the delay signal to the duty cycle adjustment unit, the delay signal having a delay substantially equal to a delay of an output signal of the I/O driver, the output signal of the I/O driver being applied to the bus,
the duty cycle adjustment unit, after processing the delay signal, outputs an enable signal to the enable terminal of the comparison unit, the enable signal having a rising edge that is delayed in relation to a rising edge of the output signal of the I/O driver and a falling edge that is substantially aligned with a falling edge of the output signal of the I/O driver, and
the comparison unit compares a voltage level of the output signal of the I/O driver on the bus with the reference voltage when the enable signal is in a stable state and determine a bus condition in response to a comparison result.

2. The circuit of claim 1, wherein the comparison unit determines that the bus condition is a bus contention condition when the voltage level of the output signal of the I/O driver on the bus is lower than or equal to the reference voltage, and that the bus condition is a normal bus condition when the voltage level of the output signal of the I/O driver on the bus is higher than the reference voltage.

3. The circuit of claim 1, wherein the comparison unit outputs a first voltage level when the voltage level of the output signal of the I/O driver on the bus is lower than or equal to the reference voltage, and a second voltage level when the voltage level of the output signal of the I/O driver on the bus is higher than the reference voltage, the first voltage level being higher than the second voltage level.

4. The circuit of claim 1, wherein the duty cycle adjustment unit comprises:
   a first inverter comprising an input terminal connected to the output terminal of the delay unit, a ground terminal connected to a ground potential, and an output terminal;
   a second inverter comprising an input terminal connected to the output terminal of the first inverter, a ground terminal connected to the ground potential, and an output terminal;
   a waveform integration unit comprising an input terminal connected to the output terminal of the second inverter and an output terminal;
   a capacitor comprising a first terminal connected to the output terminal of the second inverter and the input terminal of the waveform integration unit at a node, and a second terminal connected to the ground potential; and
   a current source having an output terminal connected to a power supply terminal of the first inverter and a power supply terminal of the second inverter.

5. The circuit of claim 4, wherein the waveform integration unit comprises:
   a plurality of series-connected stage inverters, a subsequent stage inverter having a signal magnification factor being higher than a signal magnification factor of an immediate preceding stage inverter, a stage inverter having a lowest signal magnification factor being connected to the output terminal of the second inverter, and a stage inverter having a highest signal magnification factor being a last stage inverter of the series-connected stage inverters.

6. The circuit of claim 4, wherein the first inverter comprises a first PMOS transistor and a first NMOS transistor, the first PMOS transistor having a gate connected to a gate of the first NMOS transistor and the input terminal of the first inverter, a source connected to the power supply terminal of the first inverter and the output terminal of the current source, and a drain connected to a drain of the first NMOS transistor and to the output terminal of the first inverter; the first NMOS transistor having a source connected to the ground potential.

7. The circuit of claim 4, wherein the second inverter comprises a second PMOS transistor and a second NMOS transistor, the second PMOS transistor having a gate connected to a gate of the second NMOS transistor and the input terminal of the second inverter, a source connected to the power supply terminal of the second inverter and the output terminal of the current source, and a drain connected to a drain of the second NMOS transistor and to the output terminal of the second inverter; the second NMOS transistor having a source connected to the ground potential.

8. The circuit of claim 1, wherein the delay unit comprises:
   a plurality of series-connected stage inverters, a first stage inverter of the series-connected stage inverters having an input terminal connected to the input terminal of the delay unit and the input terminal of the I/O driver; a last stage inverter of the series-connected stage inverters having an output terminal connected to the output terminal of the delay unit and the input terminal of the duty cycle adjustment unit.

9. The circuit of claim 1, wherein the reference voltage is k times a voltage level of the output signal of the I/O driver on the bus under a normal bus condition, k being a scaling factor.

10. The circuit of claim 1, wherein k satisfies the relation:

$0.9 \leq k < 1.0$

11. The circuit of claim 1, wherein the delay signal, the enable signal and the output signal of the I/O driver each are rectangular wave signals.

* * * * *